INVENTORS
ADAM JUHASZ
JANOS KONKOLY
BY Irwin J. Thompson
ATTY.

Sept. 6, 1966  A. JUHASZ ET AL  3,270,887
FILTER PRESSES FOR SEPARATING SOLIDS FROM LIQUIDS
Original Filed Dec. 19, 1961  7 Sheets-Sheet 2

INVENTORS
ADAM JUHASZ
JANOS KONKOLY
BY Irwin S. Thompson
ATTY.

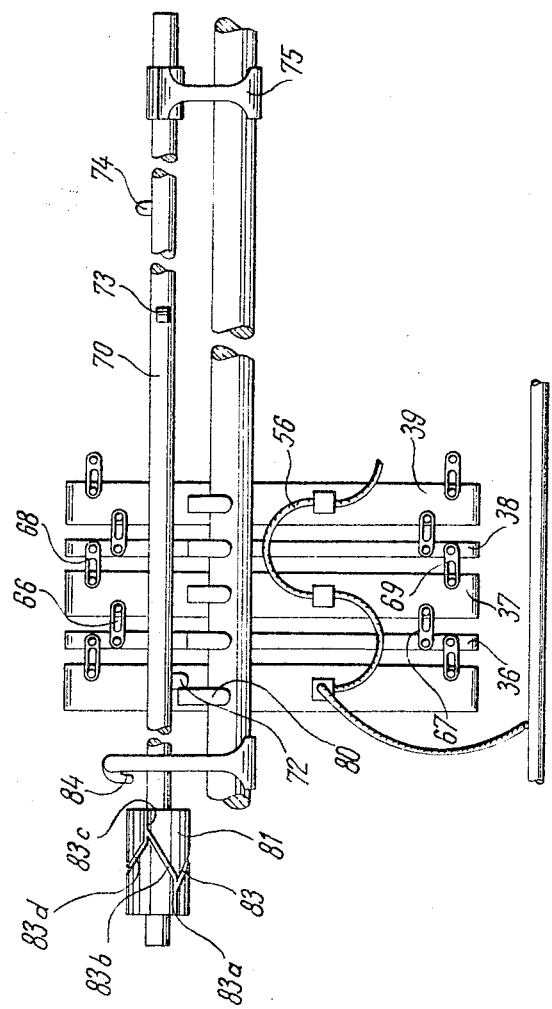

Sept. 6, 1966    A. JUHASZ ET AL    3,270,887
FILTER PRESSES FOR SEPARATING SOLIDS FROM LIQUIDS
Original Filed Dec. 19, 1961    7 Sheets-Sheet 4

INVENTORS
ADAM JUHASZ
JANOS KONKOLY
BY Irwin S. Thompson
ATTY.

Sept. 6, 1966 A. JUHASZ ETAL 3,270,887
FILTER PRESSES FOR SEPARATING SOLIDS FROM LIQUIDS
Original Filed Dec. 19, 1961 7 Sheets-Sheet 5

INVENTORS
ADAM JUHASZ
JANOS KONKOLY
By Irwin S. Thompson
ATTY.

Sept. 6, 1966    A. JUHASZ ET AL    3,270,887
FILTER PRESSES FOR SEPARATING SOLIDS FROM LIQUIDS
Original Filed Dec. 19, 1961    7 Sheets-Sheet 6

INVENTORS
ADAM JUHASZ
JANOS KONKOLY
By Irwin S. Thompson
Atty.

Sept. 6, 1966      A. JUHASZ ETAL      3,270,887
FILTER PRESSES FOR SEPARATING SOLIDS FROM LIQUIDS
Original Filed Dec. 19, 1961      7 Sheets-Sheet 7
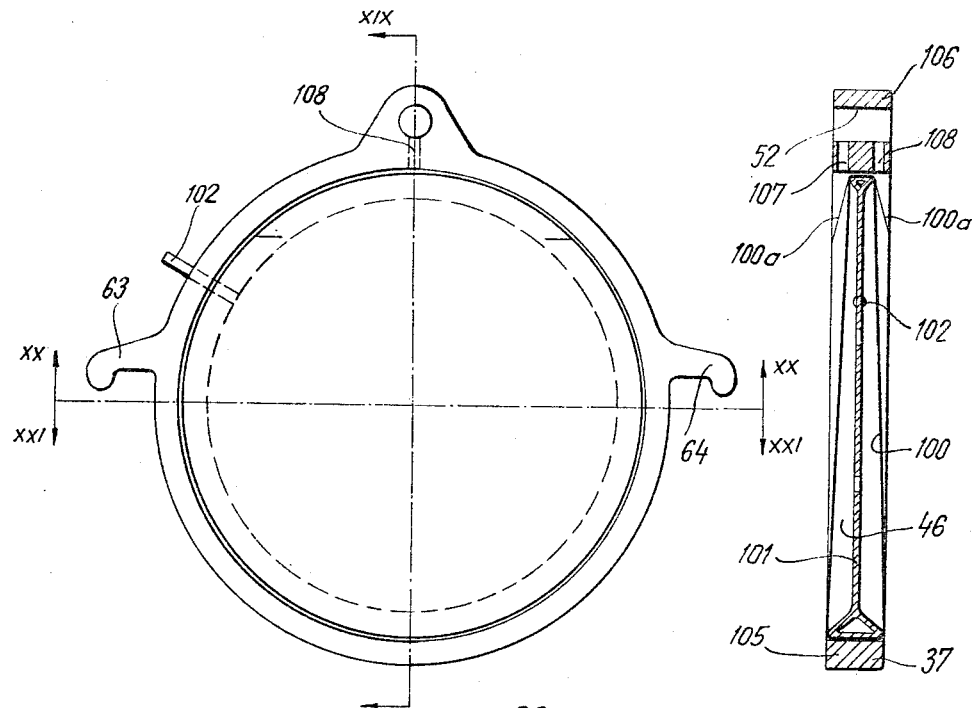
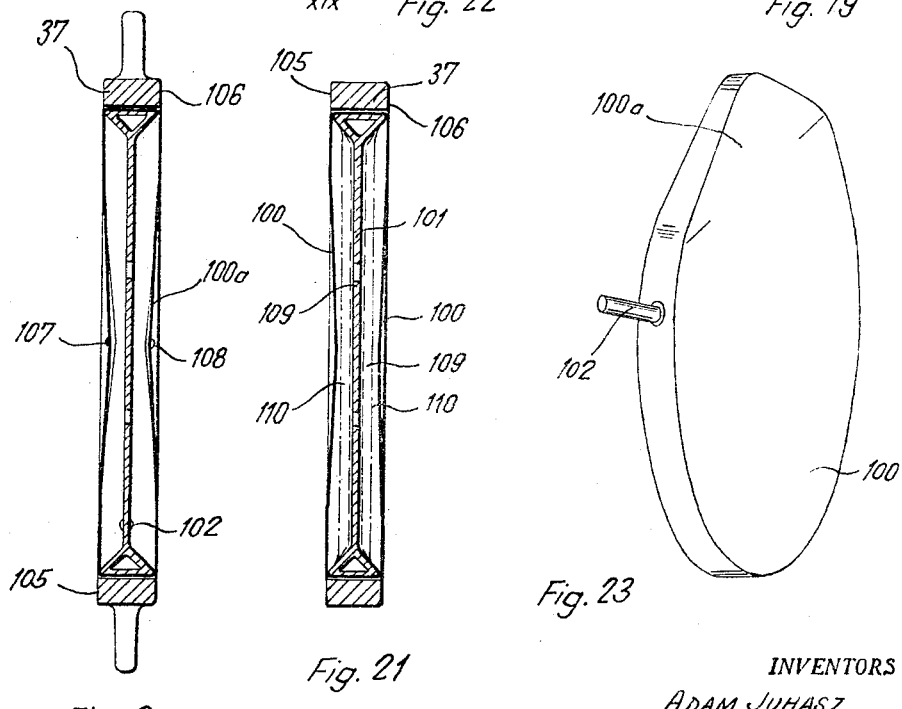
INVENTORS
ADAM JUHASZ
JANOS KONKOLY
By Irwin J. Thompson
ATTY.

United States Patent Office 3,270,887
Patented Sept. 6, 1966

3,270,887
FILTER PRESSES FOR SEPARATING SOLIDS FROM LIQUIDS
Adam Juhasz, Almasfuzito, and Janos Konkoly, Mosonmagyarovar, Hungary, assignors to Almasfuzitoi Timfoldgyar, Almasfuzito, Hungary
Continuation of application Ser. No. 161,340, Dec. 19, 1961. This application Sept. 15, 1965, Ser. No. 490,771
6 Claims. (Cl. 210—225)

This application is a continuation of application Serial No. 161,340, filed December 19, 1961, and now abandoned.

This invention relates to filter presses for separating solids from liquids, more particularly for filtering fluid mixtures thereof such as slurries, suspensions and the like.

Filter presses of the type having a series of displaceable filter members such as filter plates and filter frames which enclose filter chambers with one another are already known. They are provided with inlet and outlet means for admitting a fluid mixture such as a slurry or a suspension to be filtered under feed pressure into and withdrawing a filtrate from said filter chambers the joints of which are sealed by closing means operated by hand or mechanically. Such filter presses are distinguished by their simple construction, low costs, favorable operability and great versatility.

On the other hand, they require a considerable period of time of several hours for performing a complete filtration cycle due to which their output as per unit of filtration area is very low. Moreover, the greater part of the filtration cycle is occupied by handling operations, mainly by the removal of residues from portions (so-called cake chambers) of the filter chambers where solid particles of the fluid mixture to be filtered are retained in the form of "filter cakes." Being nonautomatic, the known filter presses require a number of operators which, in addition to the long filtration cycles, further increases the operational costs. Furthermore, the cake chambers have to be completely filled with residues since otherwise no conveniently dry filter cakes can be obtained. Now, at starting a filtration cycle the cake chambers are quickly filled with filter cakes of loose consistency, which, then, become ever more compact under the action of feed pressure. Such increasing of compactness, however, is a very slow process because all space left behind the compressing filter cakes receives further amounts of fluid mixture the liquid portion of which is now bound to penetrate through layers of already increased compactness and, thus, to overcome a considerable flow resistance. For instance, it has been ascertained that, with a filter press having a filtration cycle of 3 hours time period, the cake chambers are filled up by loose filter cakes already in the first 10 or 20 minutes of the filtration cycle whereas the remainder of the cycle period is needed for compressing the loose filter cakes or for increasing their consistency under the action of feed pressure. Therefore, the filtration output of the first 30 minutes is greater than that of the following two hours and a half. The compression time might be shortened only by increasing the so-called adhesion moisture present in the cakes which is otherwise undesirable since the dryer the cakes, generally the better. Neither is it possible to adapt the thickness of the filter cakes to various properties of slurries or suspensions just becaue the cake chambers, for reasons stated, have always to be completely filled by residues. Thus, the feed pressure has to be maintained during the whole period of filtration whereby feed pumps and their accessories are exposed to the wearing action of solid particles in the fluid mixtures flowing therethrough during like periods of time. This prevents also an economic pressure elevation which, otherwise, would be highly welcomed.

The main object of the present invention is to obviate the aforesaid inconveniences and to provide a filter press capable of entire automatization and suitably adaptable to the nature of various slurries and suspensions.

Another object of the present invention is to enable filter presses to exert elevated pressures on slurries or suspensions within practically desirable limits by means of pure gaseous or liquid media.

Still another object of the present invention is to employ elevated pressures in filtration processes so as to increase the output of filter presses and, more particularly, to further the dessication of filter cakes.

A further object of the present invention is to decrease the time period of the filtration cycles from several hours to some minutes and thereby to increase the output of filter presses.

A still further object of the present invention is to decrease the adhesion moisture of filter cakes by means of elevated compression pressures whereby further drying operations may be dispensed with or considerably reduced.

Still another object of the present invention is to enable filter cakes to be removed simultaneously from all filter chambers or from a number thereof mechanically so as to considerably shorten the time period of handling.

A further object of the present invention is to render already existing filter presses suitable for performing filtration operations in compliance with the present invention.

The basic idea of the invention is that filter chambers as used in known filter presses have to be subdivided in a suitable manner so as to comprise—besides the usual cake chambers—also resilient chambers of elastic walls. Then, of these two types of chambers the cake chambers receive the fluid mixture to be filtered under feed pressure in the conventional manner. The elastically walled chambers, on the other hand, form, as it were, resilient bodies suitable for automatic cake discharge. Viz., upon being deformed by a pressure (caused for example by filter cakes of increasing volume), such a body is urged to resume its original shape and thereby to push the alien body off. Obviously, such elastically walled chambers are also suitable to be connected to a controllable source of gaseous or liquid pressure medium. Then, dependent on the pressure difference on both sides of the elastic wall, either the volume of the cake chamber or that of the resilient chamber grows at the expense of the other. Thus, filtering having been terminated, the filter cakes may be exposed to compression by establishing a suitable overpressure in the resilient chambers. The filter cakes formed in the cake chambers can likewise be discharged by applying such pressure to the resilient chambers so as to bulge out their elastic walls.

Further objects and features of the invention will be described by taking reference to the accompanying drawings which show, by way of example, several embodiments thereof. More particularly:

FIG. 5 shows a further detail of FIG. 1 on a relatively larger scale.

FIGS. 19 to 21 represent various longitudinal sectional views taken along lines XIX—XIX, XX—XX and XXI—XXI, respectively, of FIG. 22 of a still further modified form of filter frame.

FIG. 22 is a front elevational view of the filter frame shown in FIGS. 19 to 21. Finally:

FIG. 23 illustrates a perspective view of a detail of FIGS. 19 to 22.

Like reference characters in various figures of the drawing generally refer to similar details of the invention.

Figure 1:
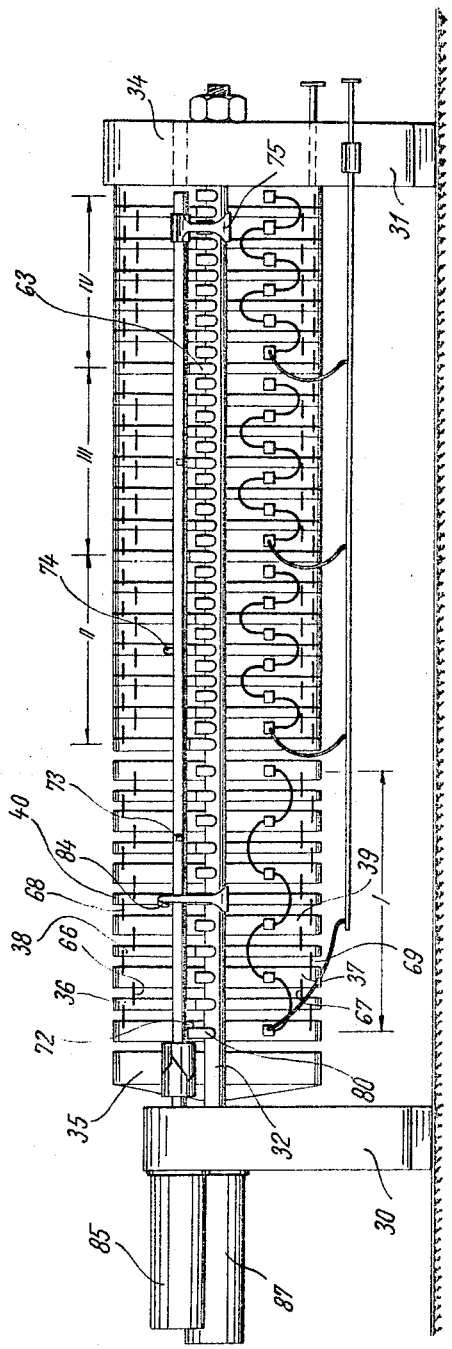
FIG. 1 is a side elevational view of an exemplified embodiment of a filter press of the flush plate and frame type according to the invention.

In the drawings, reference characters 30 and 31 designate short and long legs, respectively, or end supports of a filter press of the flush plate and frame type (FIG. 1) the filter plates and frames of which are displaceably arranged on a pair of parallel horizontal side bars 32 and 33 (FIG. 2), which connect said legs or end supports 30 and 31. The filter plates and filter frames are sandwiched by a fixed head 34 and a slide head 35 in the usual manner. In the instant case there are four larger groups I to IV (FIG. 1) of such filter members each group comprising six filter frames arranged between pairs of filter plates and, for the first and last frame of the entire series, the fixed and slide heads 34 and 35, respectively.

Smaller groups of said filter plates and frames, each consisting of a filter frame flanked by a pair of filter plates, enclose filter chambers in which the separation of the liquid and solid particles of a fluid mixture such as a slurry or suspension takes place.

Figure 4:
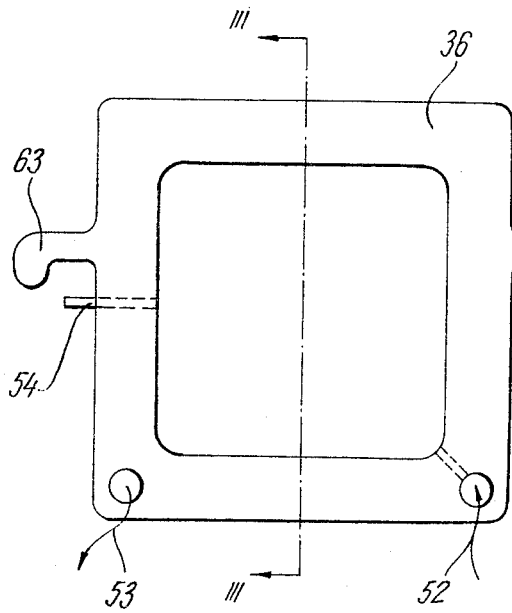
FIG. 4 is a front elevational view of the group of filter plates and filter frames shown in FIG. 3.
Figure 3:
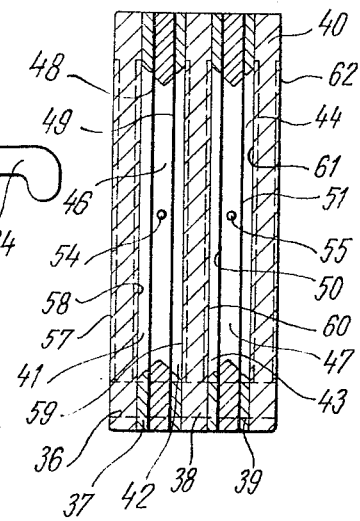
FIG. 3 is a longitudinal sectional view taken along the line III—III of FIG. 4 of a group of filter members.

A pair of adjacent filter chambers is illustrated in FIGS. 3 and 4. The first filter chamber is enclosed by a filter plate 36, a filter frame 37 and a filter plate 38. The second filter chamber of the pair of such chambers is enclosed by said filter plate 38, by a further filter frame 39 and by a third filter plate 40 in the usual manner. The filter chambers groupwise enclosed by filter plates and filter frames such as 36, 37, 38, and 38, 39, 40, respectively, in the described manner are, according to the main feature of the invention, further subdivided so as to comprise, besides cake chambers 41, 42, 43, 44 of the usual destination, also the aforesaid resilient chambers such as 46 and 47. For this purpose, elastic partitions made of natural or synthetic rubber or like elastic materials are fixed in the manner of membranes in the filter frames, such as partitions 48 and 49 in frame 37 or partitions 50 and 51 in frame 39. Said elastic partitions may be made for example of heat resistant rubber having a thickness of about 2 to 3 millimeters, the module of which is 50 degrees Shore, at an elongation of 300% and a hardness of 1 kilogram per square millimeter.

Thus in the instant case, the cake chamber 41 is confined by the filter plate 36 and the elastic partition 48, the cake chamber 42 is confined by the elastic partition 49 and the filter plate 38, the cake chamber 43 is confined by the filter plate 38 and the elastic partition 50 and, finally, the cake chamber 44 is enclosed by the elastic partition 51 and the filter plate 40, filter plates as well as resilient chambers being flanked each by pairs of cake chambers.

The cake chambers 41, 42, 43, 44 communicate, in a manner known per se, with a channel or feed inlet 52 for receiving a fluid mixture to be filtered, and with a drain or exit channel 53 for discharging the liquid portion of the mixture in the form of a filtrate.

The resilient chambers 46 and 47, on the other hand, may communicate groupwise with a not represented hydraulic or pneumatic source of adjustable pressure through ducts or channels 54 and 55, respectively, connected in series by flexible pipes 56 (FIG. 5).

Furthermore, the filter plates 36, 38, 40 are covered each with a pair of filter cloths 57 to 62, respectively, and both the filter plates 36, 38, 40 and the filter frames 37, 39 are provided with supporting lugs or handles as indicated by reference characters 63 and 64 (for example in FIG. 4).

Further filter members of the represented filter press have a like construction. Moreover, the members of their larger groups I to IV are connected groupwise so as to be simultaneously displaceable with respect to one another within predetermined limits providing just enough place between adjacent members for cleaning purposes. Such distance is for instance by 1 to 10 centimeters, preferably by 2 centimeters, greater than the thickness of the cake to be removed, in contradistinction to distances of 40 to 80 centimeters usual with hitherto known filter presses. Such decrease of the mutual distances between adjacent filter members in opened positions of the filter chambers is of high importance since it permits removal of filter cakes from all cake chambers or from a group thereof simultaneously without increasing the space required and, thereby, to shorten the time period of handling to a fraction of the hitherto inevitable values, which have been due to the filter frames being handled individually and by hand.

For the purpose of such reduced mutual displacements of adjacent filter plates and filter frames, the members of said larger groups I to IV are pairwise connected by grooved shackles as indicated in case of filter plates 36, 38 and filter frame 37 by reference characters 66, 67 and 68, 69, respectively (FIG. 5). Obviously, such shackles permit a mutual displacement of the filter members of the same larger groups I to IV but to predetermined extent and yet do not prevent their mutual approaching so as to resume an entirely closed position wherein joints between adjacent filter members are thoroughly sealed by an otherwise usual closing device 87 to be briefly described hereinafter.

For such groupwise motion, a pair of slidably and rotatably arranged control bars 70 and 71 are provided which carry control toes 72, 73, 74, 75 and 76, 77, 78, 79, respectively, disposed mutually at right angles. The control toes or pins 72 to 79 cooperate each with the first member of a larger group I to IV of filter plates and frames for which purpose the supporting lugs or handles 63 and 64 of such members have a greater height than the others as indicated at reference character 80 in FIG. 1. The rotatable control bars 70 and 71 carry also control cylinders 81 and 82 (FIG. 2), respectively, each of which is provided with control grooves as indicated by reference character 83 in FIG. 5.

Figure 6:
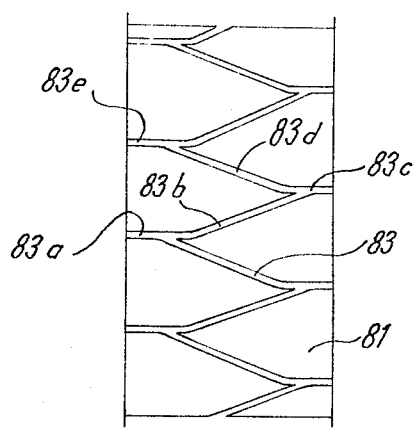
FIG. 6 is the development of a cylindrical surface forming part of a control device of the represented filter press.

The groove 83 which cooperates with a control pin 84 fastened to the side bar 32 is shown developed in FIG. 6 on a larger scale. As shown, the groove 83 has eight angularly equidistanced starts which correspond to eight different angular positions of the control cylinder 81 and control bar 70, each angular distance amounting to 45°. Thus, the number of "larger" groups I to IV is equal to half of the number of starts. On the other hand, the control toes 72 to 75 of control bar 70 being mutually disposed at right angles, two subsequent angular displacements of the control cylinder 81 under 45°, due to engagements of stationary pin 84 with rotatable groove 83 and alternate linear motion of control bars 70 and 71, are required to entail an angular displacement at right angle of the control toes 72 to 75. Like pin and groove engagement is provided for control cylinder 82.

The control bars 70 and 71 have their alternate linear motions imparted to them by hydraulic rams 85 and 86, respectively, the constructional details of which are known per se and, therefore, not represented in the drawing. At the end of each forward stroke of the hydraulic rams 85 and 86, the control bars 70 and 71, respectively, are rotated by an angle of 45°. At the beginning of each backward stroke of the same rams, they are again turned by an angle of 45° so that the angular displacements of the control bars 70 and 71, and thereby the control toes 72 to 75 and 76 to 79, amount to a right angle after every other stroke. Thus, each pair of forward and backward strokes of the hydraulic rams 85 and 86 corresponds on both sides of the filter press to an engagement of a control toe with the relatively longer supporting lug or handle 80 of a first member of a larger group of filter members and to mutually distanced positions of the group members. Furthermore, it corresponds to a disengagement between the control toe and supporting lugs or handles of the first member of the last actuated larger group and, finally, to an engagement of the following control toe with its associated supporting lug or handle, etc.

In other words, because the finger 84 is fixed, the fixed finger enters and moves in a groove 83 as the cylinders 81, 82 reciprocate. The grooves 83, however, follow a general zig-zag pattern, such that the cylinders are rotated stepwise as they are reciprocated. This ensures stepwise rotation of the bars 70, 71 as they reciprocate, and the toes carried by those bars then engage the first pair of supporting lugs of each group of filter members serially to open each group of filter members. The opening of a subsequent group of filter members moves the previously opened group back together again, with the result that a much shorter bed for the filter press is needed than if all the filter members were opened simultaneously.

Reference character 87 refers to a further hydraulic ram which is provided as said closing device for actuating the slide head 35 of the filter press destined to sandwich the entire series of filter plates and frames with the fixed head 34 so as to seal the joints between adjacent filter members in a manner well known to those skilled in the art and, therefore, not described or illustrated as to its details.

Figure 7:
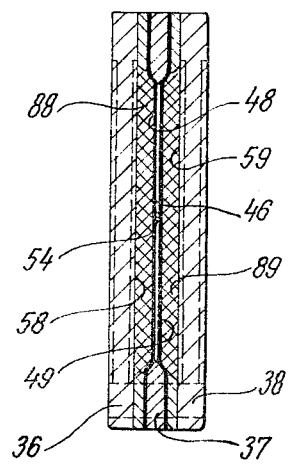
FIGS. 7 to 10 illustrate a filter chamber such as shown in FIGS. 3 and 4 in various operational positions.

In operation, filtering takes place in conventional manner so that a closer description thereof may be dispensed with. It will be sufficient to remark that the fluid mixture to be filtered (e.g. a slurry or suspension) under a feed pressure of for example 10 atmospheres is admitted through the feed channel 52 into the cake chambers such as 41 and 42 (FIG. 3). The solid residue of the fluid mixture is retained here by the filter cloths such as 58 and 59 and forms cakes such as 88 and 89 shown in FIG. 7. The growing cakes 88 and 89 exert a pressure on the elastic partitions 48 and 49 which assume a concave form as viewed from the cake chambers 41 and 42 (FIG. 3) as long as the resilient chamber 46 is relieved from pressure.

Figure 8:
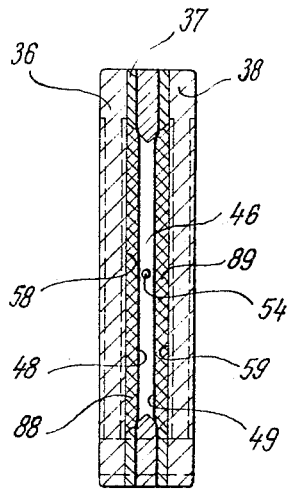

When the cake chambers 41 and 42 are filled with residue of relatively loose consistency, a pressure such as 20 atmospheres is permitted to prevail in the resilient chamber 46 high enough to overwhelm the pressure (feed pressure) under which the fluid mixture is supplied to the cake chambers 41 and 42. At such pressure difference, the filter cakes 88 and 89 become compressed by means of the elastic partitions 48 and 49, respectively, as illustrated in FIG. 8. Obviously, their consistency substantially increases thereby and also their adhesion moisture is expelled to desired values which has hitherto been unfeasible.

Figure 2:
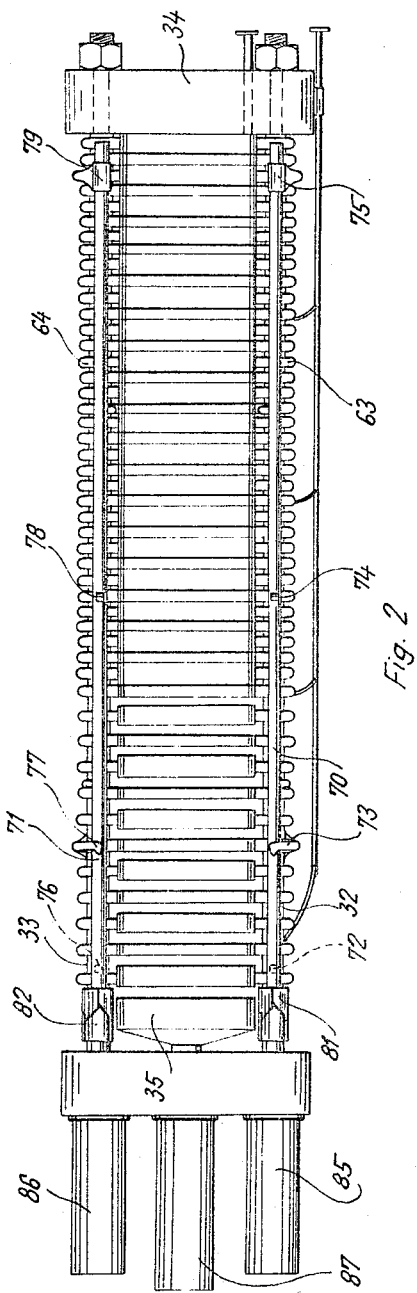
FIG. 2 is a top view of the filter press shown in FIG. 1.
Figures 9, 10:
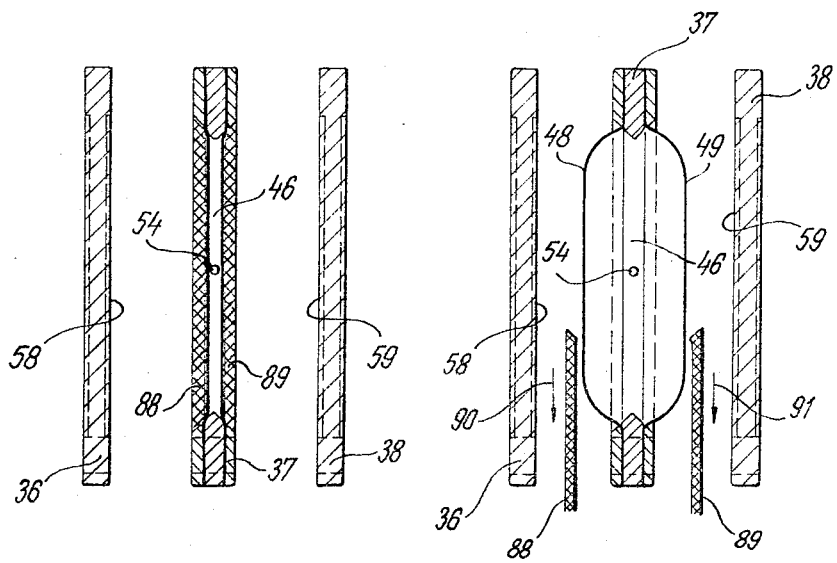

Upon reaching a prescribed consistency and/or adhesion moisture of the cakes 88 and 89 by means of filtering and/or washing and compression operations, their removal from the cake chambers 41 and 42, respectively, becomes due. For this purpose, the hydraulic ram 87 (FIGS. 1 and 2) is actuated so as to cause the slide head 35 of the filter press to part with the series of filter plates and frames and, thereby, to raise the seal off the joints between adjacent filter members. Thereafter, also the hydraulic rams 85 and 86 are actuated for a complete cycle of alternate movements whereby the control bars 70 and 71 are displaced first in right-hand direction as regards FIGS. 1 and 2 so that pin 84 and its sister pin engage the control grooves of the control cylinders 81 and 82 and cause them to be angularly displaced under an angle of 45°. Immediately thereupon, the control bars 70 and 71 are moved backwards (in the left-hand direction as regards FIGS. 1 and 2) so that control cylinders 81 and 82 undergo a further angular displacement of 45° in the same direction which results in that control bars 70 and 71 suffer an angular displacement at right angle between every other stroke. Thus, control toes 72 and 76 become engaged with the first pair of supporting lugs or handles of the first filter member (a frame) of the first larger group I of such members and cause the filter members of said group to be mutually distanced as illustrated in FIGS. 1, 2 and 5 so far as the shackles, for example 66 and 69, permit of such displacement. The mutual positions of a smaller group of filter members consisting of a filter frame 37 flanked by a pair of filter plates 36 and 38 are represented in FIG. 9. Obviously, together with the engagement of control toes 72 and 76 with their associated supporting lugs or handles, those of the last or fourth larger group IV of filter members have become disengaged with control toes 75 and 79, respectively.

The filter cakes 88 and 89 are then removed from their respective chambers 41 and 42 by admitting a pressure such as 0.3 atmosphere into the resilient chamber 46 through duct or channel 54 whereupon the elastic partitions 48 and 49 are urged to resume an inflated form (FIG. 10) which causes the filter cakes 88 and 89 to be thrust out from their seats in the filter frame 37 and to drop through spaces left free between adjacent filter plates and filter frames as indicatd by arrows 90 and 91 in FIG. 10. Hereby, emptying of the first larger group I of filter members is terminated.

Then, hydraulic rams 85 and 86 are again actuated for a subsequent pair of alternate strokes while groove 83 of the control cylinder 81 is again twice engaged with pin 84 which repasses now the straight right-hand groove section 83c and then passes through a subsequent medial oblique portion 83d, whereafter it passes through a straight left-hand groove portion 83e (FIG. 6). At the beginning of the backward stroke, the pin 84 passes, by beginning with left-hand straight groove portion 83e, a further series of such groove portions causing thereby an angular displacement of control bar 70 by twice 45°, viz., by right angle. The result is that the second "larger" group II is brought into a position where its filter chambers are open and its cake chambers may be emptied by means of applying an overpressure to its resilient chambers. Obviously, the third and fourth larger groups III and IV of filter plates and frames are opened and cleaned or emtptied in a like manner while the operation of the control cylinder 82 on control bar 71 is quite similar to that of control cylinder 81 and its associated parts hereinbefore described.

Figure 11:
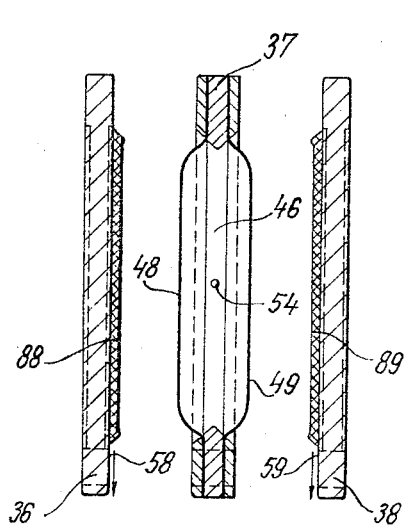
FIG. 11 illustrates a mode of operation different from that shown in FIG. 10.

If, for some reason, it is desired that the filter cakes 88, 89, instead of sticking to the filter frame 37, cling to the filter plates 36 and 38, or else the solid residues of the fluid mixture to be filtered have a tendency to adhere to the filter cloths 58 and 59 which confine the cake chambers 41 and 42, respectively, on one side thereof when the filter chambers are closed, the pressure admitted into the resilient chamber 46 is selected so as to cause the filter cakes 88 and 89 to adhere to the filter plates 36 and 38, more particularly to their cloths 58 and 59, respectively, or to further such adhesion. In such cases, the filter cakes 88 and 89 are, upon opening the filter chamber 41, 46, 42 (FIG. 3), moving with the filter plates 36 and 38, respectively, as shown in FIG. 11.

Their removal can then be effected by admitting a slight pressure of for example 0.5 to 2 atmospheres below the filter cloths 58 and 59 through the discharge or drain channel 53, or by applying a slight shock or vibration to the filter members to be emptied.

Figure 12:
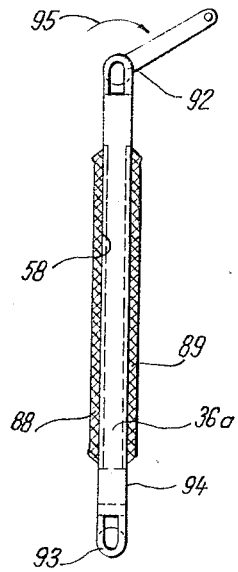
FIG. 12 represents a modified form of a filter plate in a side elevational view.
Figure 13:
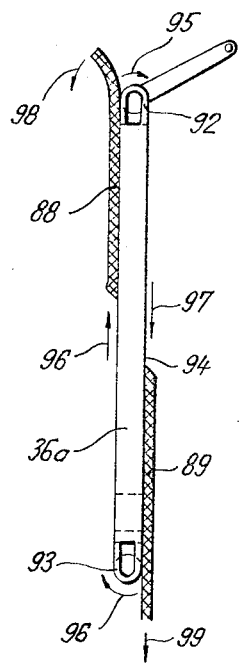
FIG. 13 shows an operational position of the filter plate shown in FIG. 12.
Figure 13A:
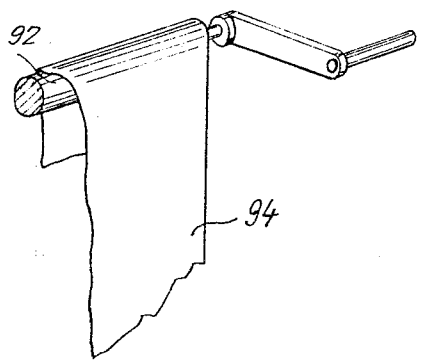
FIG. 13a shows the roller and belt of FIGS. 12 and 13.
Figure 14:
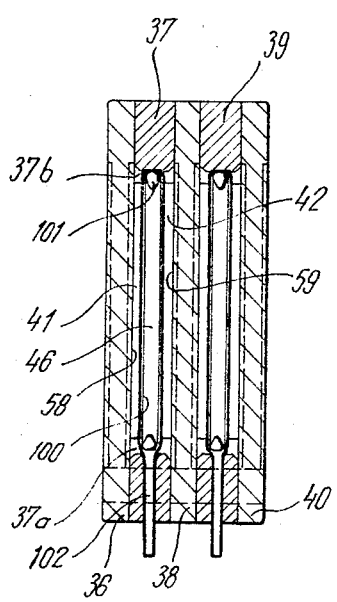
FIG. 14 is a longitudinal sectional view taken along line XIV—XIV of FIG. 15 and representing a further modified form of a smaller group of filter members enclosing filter chambers.
Figure 15:
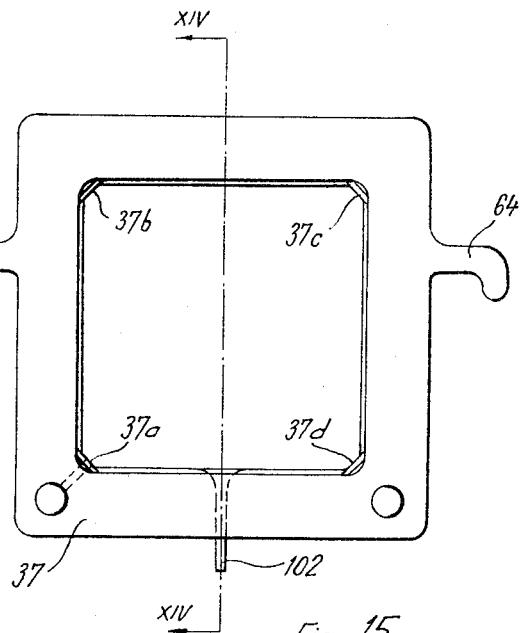
FIG. 15 is a front elevational view of the group shown in FIG. 14.

It is, however, possible to apply filter cloths in belt form arranged for revolution around their associated filter plates. Such an embodiment is shown in FIG. 12 where the filter plate is indicated by reference character 36a. On its top and at its bottom the filter plate 36a carries rollers 92 and 93, respectively, which, in turn, serve for guiding a belt 94 made of filter cloth. One of the rollers 92 and 93 is suitable for being driven, say, by a hand lever (as represented in the drawing) or mechanically, in any known manner. Upon rotating roller 92 in the direction of arrow 95, the filter cloth belt 94 is set into revolving motion in the direction of arrows 96 and 97 (FIG. 13), so that filter cakes 88 and 89, unable to follow the curvatures inflicted upon the filter cloth belt 94 by rollers 92 and 93, part with the former and drop through spaces between filter plates and filter frames in their mutually distanced positions as suggested by arrows 98 and 99.

FIGS. 14 to 18 show an embodiment which differs from the previous one only in that pairs of elastic partitions which flank the resilient chambers such as partitions 48 and 49 of the previous embodiment (FIG. 3), are united to elastic bags having struts or frames by means of which they are braced against collapse and undue deformation. Such elastic bag 100 with its strut 101 is shown in the left-hand portion of FIG. 14 which represents again a pair of adjacent filter chambers like FIG. 3. The bag 100 is fixed in the frame 37 for example by corner fillets 37a, 37b, 37c, 37d (FIGS. 14 and 15) or any other suitable means. Its interior is connected to the above-mentioned hydraulic or pneumatic source of adjustable pressure through a nose 102 which serves, at the same time, in cooperation with the corner fillets 37a, 37b, 37c, 37d and the strut 101, to fix the mutual position of elastic bag 100 and filter frame 37. Further elastic bags may be of the same construction as shown in the right-hand portion of FIG. 14.

Figure 16:
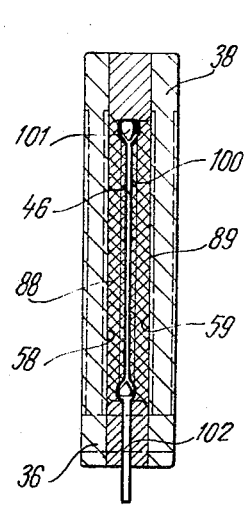
FIGS. 16 to 18 illustrate various operational positions of filter chambers as shown in FIGS. 14 and 15.
Figure 17:
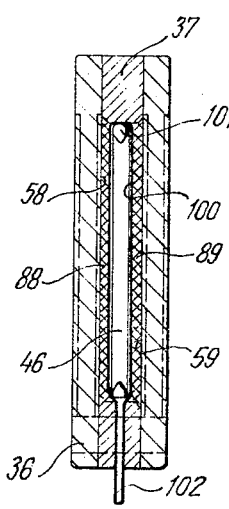
Figure 18:
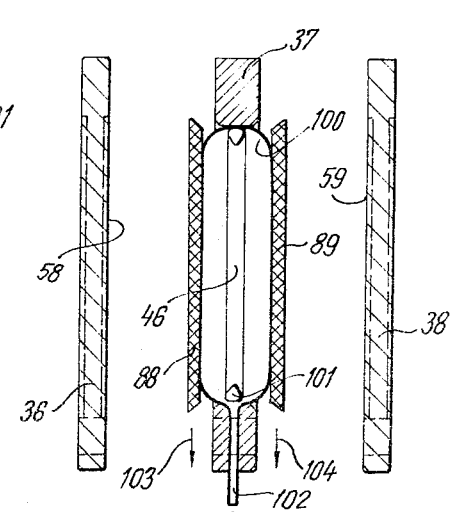

Filtering, washing and cleaning is carried out in the same manner as has been described in connection with the exemplified embodiment shown in FIGS. 3 to 11. FIG. 16 illustrates the filter cakes 88 and 89 in their uncompressed state where the walls of the elastic bag 100 are strongly pushed in. FIG. 17 represents the cakes 88 and 89 being compressed by a pressure (of for example 15 atmospheres) admitted into the elastic bag 100 which forms the resilient chamber 46. Finally, FIG. 18 which corresponds to FIG. 10 of the previous embodiment shows the filter plates 36 and 38 removed from the filter frame 37 and the elastic bag 100 inflated so as to thrust out the filter cakes 88 and 89 from their seats in filter frame 37. Obviously, the former will then drop as indicated by arrows 103 and 104 in FIG. 18.

As has been shown, the exemplified embodiments comprising elastic partitions in the form of membranes (FIGS. 3 to 11) or in the form of elastic bags (FIGS. 14 to 18) differ from one another as regards their construction rather than the way of their operation. While the filter frames of the exemplified embodiment shown in FIGS. 4 to 11 are shown as being composed of three individual parts pairwise sandwiching an elastic partition as a membrane or diaphragm, with the exemplified embodiment illustrated in FIGS. 14 to 18 the filter frame 37 may be an integral constructional part since the elastic partitions are formed by the walls of the elastic bags which do not need being clamped like membranes. Apart from this difference as to number of constructional parts, it is obvious that also the maintenance of filter presses, the elastic partitions of which are formed by elastic bags, is considerably more simple than that of filter presses with membranes for elastic partitions. Should any of the elastic bags break down (for example in consequence of a puncture), the respective filter frame is easily restorable by substituting the faulty elastic bag by a sound one. On the other hand, if only one of a pair of elastic partitions becomes unserviceable, the filter frame already has to be partly dismantled so as to enable the defective membrane to be replaced by a flawless one.

Another exemplified embodiment of using elastic bags instead of membrane-shaped elastic partitions is shown in FIGS. 19 to 23. In the instant case, the dimensions of the elastic bag 100 and its strut or reinforcing frame 101 are selected so that the elastic partitions formed by side walls of the elastic bag 100 are made flush with the filter frame 37 which means that, in inoperational position of the bag 100, its walls are disposed in the same planes as the front surfaces 105 and 106 of the filter frame 37. As shown in FIG. 23, the elastic bag 100 has a tapering portion 100a which occupies a position opposite to admission passages 107 and 108 (FIG. 19) in the filter frame 37 so as to offer an unobstructed entry to the fluid mixture to be filtered.

The significance of such embodiment consists in that the use of a hydraulic or pneumatic source of adjustable pressure may be restricted to compressing the cakes while they are formed in the cake chambers so as to render them more compact and to possibly reduce their adhesion moisture, the removal of the filter cakes proper being effected by the elastic side walls of the elastic bags 100. Moreover, if such compression of the filter cakes is not desired, the elastic bags 100 may form resilient chambers without the possibility of applying to their interior an adjustable pressure. Then, also the nose 102 may be dispensed with, the resilient chamber 46 being the inner space of an entirely closed elastic bag probably braced by its frame 101. Obviously, such an embodiment is particularly suitable for rendering already existing filter presses operable in accordance with the present invention.

In operation of the embodiment shown in FIGS. 19 to 23, the inflowing fluid mixture to be filtered causes the walls of the elastic bag 100 to assume a concave form as indicated by broken lines 109 in FIG. 21. Then, a suitable pressure is admitted through the nose 102 into the resilient chamber 46 inside the elastic bag 100 whereby its side walls resume a less concave position indicated by dash-and-dot line 110 and compress the filter cakes 88 and 89 left behind by the filtrate. Upon opening the filter chambers, the elastic side walls of the elastic bag 100 are relieved from their distorting pressures so that they resume their original positions represented by solid lines whereby the previously compressed filter cakes are thrust out from their seats in the filter frame 37. Thus, the exemplified embodiment shown in FIGS. 19 to 23 is suitable to dispense with employing an overpressure to the resilient chambers for cake discharge purposes and to render such discharge fully automatic.

It is seen that the invention permits rendering fully automatic all operations of which a filtering cycle is composed. However, it may be desirable, especially in case of filtering thin suspensions, to compress and remove the filter cakes automatically, or else to empty the cake chambers by means of elastic partitions whereas all other operations are carried out in the conventional manner. If the filter cakes are compressed prior to their removal from the cake chambers, they will preferably be compressed at an elevated pressure with respect to filtering as has been referred to in the description of the exemplified embodiments where numerical values are set forth concerning such pressure relations. Generally, about 1 to 15 atmospheres and 10 to 50 atmospheres have been found suitable values for the purposes of filtering and compressing, respectively. Then, the entire filter cycle will be substantially more economic since the time period of a cycle is radically reduced thereby.

The invention has been described in connection with filter presses of the flush plate and frame type. It is, however, obvious that the same principle of employing resilient chambers besides the cake chambers can be applied to filter presses of the recessed plate type as well where the resilient chambers with ribbed surfaces—in the form of bags—are accommodated between filter cloth and recessed plate as will be apparent to those skilled in the art. Furthermore, in the exemplified embodiment a substantial number of filter chambers are employed with groupwise actuation. However, depending upon desired capacity and space limitations, any or the total number of plates and frames may be operated in a like manner as special circumstances may require. The filter members have been described as actuated by hydraulic means. Obviously, pneumatic or mechanical or any other suitable means might as well be used for such purpose. Also, mutual distancing and closing of the filter members might be effected, in lieu of the slide head, by means of the long leg which then is arranged for axial displacement.

Having described our invention, we claim:

1. A filter press comprising a plurality of filter members, slide head means at one end of said stack of filter members, fixed head means at the other end of said stack of filter members, a closing device to move said slide head means in a direction to press said stack of filter members toward said fixed head means to close the filter press, means interconnecting the filter members of each group for mutual opening of the filter members with respect to one another, means individual to one filter member of each group of adjacent filter members for opening only the members of the group to which said one filter member belongs, control means selectively engageable with each of said individual means and cooperating with said interconnecting means to move the last-named group and to open the filter members of the last-named group in a direction such that the movement of said last-named group moves the members of a previously opened group back together again with the members of the rest of the groups being left in abutting relationship, and means independent of the closing device for actuating the control means.

2. A filter press comprising a plurality of filter members disposed in successive groups in a stack, slide head means at one end of said stack of filter members, fixed head means at the other end of said stack of filter members, a closing device to move said slide head means in a direction to press said stack of filter members toward said fixed head means to close the filter press, abutments individual to the first filter member of each group of adjacent filter members, means interconnecting the filter members of each group such that the opening of said first member opens the rest of the members of the group to which said first member belongs, control means sequentially engageable with each of said abutments, and means independent of said closing device for moving said control means in a direction to contact each of said abutments to move each group one at a time to open the filter members of the group with the opening movement of the members of the group moving the filter members of another group back together again and with the filter members of the rest of the groups being left in abutting relationship.

3. A filter press as claimed in claim 2, said control means comprising a member reciprocable lengthwise of the stack and having detents individually engageable with said abutments and spaced peripherally about said reciprocable member, said means for moving said control means comprising means for reciprocating said reciprocable member and for rotating said reciprocable member stepwise selectively to present said detents serially for engagement with said abutments.

4. A filter press comprising a plurality of filter plates, filter cloths on both sides of said filter plates, filter frames disposed in alternation between said filter plates, means to support said filter plates and filter frames in contiguous relation, means defining expansible chambers carried by the filter frames, each expansible chamber having a pair of elastic side walls each of which confronts the filter cloth on an immediately adjacent filter plate and defines with that filter cloth a filter chamber, means spacing said side walls apart so as to enable them to stretch towards each other under the action of exterior pressure, means for admitting a slurry into said filter chambers through said filter frames, means for abducting a filtrate from beneath said filter cloths through said filter plates, and means for admitting and withdrawing a fluid pressure medium into and from said expansible chambers.

5. A filter press as claimed in claim 4, and slide head means and fixed head means between which said filter plates and filter frames are disposed to form a plurality of groups of adjacent filter plates and frames, a closing device to move said slide head means in a direction to press the filter plates and filter frames in the direction of said fixed head means, control means arranged for selective engagement with any one of said groups to open the plates and frames of one group and to close the plates and frames of another group with the plates and frames of the rest of the groups being left closed, and means independent of said closing device for actuating said control means.

6. A filter press as claimed in claim 4, said means defining expansible chambers comprising elastic bladders, said spacing means comprising bracing inserts within said elastic bladders.

References Cited by the Examiner
UNITED STATES PATENTS

| | | | |
|---|---|---|---|
| 407,221 | 7/1889 | Kleemann | 210—230 X |
| 672,505 | 4/1901 | Critchlow | 210—230 |
| 1,330,332 | 2/1920 | Miller | 210—224 |
| 1,390,531 | 9/1921 | Lockwood | 210—227 |
| 1,889,225 | 11/1932 | Sperry | 210—225 |
| 2,932,399 | 4/1960 | Emele | 210—346 X |
| 2,988,222 | 6/1961 | Hagdahl | 210—350 |
| 3,084,800 | 4/1963 | Baxter | 210—401 X |
| 3,098,429 | 7/1963 | Hagglund | 210—226 X |
| 3,158,089 | 11/1964 | Fillol | 100—269 X |
| 3,207,315 | 9/1965 | Kurita | 210—230 |

REUBEN FRIEDMAN, *Primary Examiner.*

J. DECESARE, *Assistant Examiner.*